United States Patent

Staffin et al.

[15] 3,694,924
[45] Oct. 3, 1972

[54] APPARATUS FOR DRYING PARTICULATE SOLIDS

[72] Inventors: Herbert Kenneth Staffin; Robert Staffin, both of Colonia, N.J.

[73] Assignee: Hercules Incorporated, Wilmington, Del.

[22] Filed: Aug. 7, 1970

[21] Appl. No.: 61,990

[52] U.S. Cl. ............... 34/10, 34/57 R, 34/57 A, 34/57 D, 263/21 A
[51] Int. Cl. ............................................. F26b 3/08
[58] Field of Search .... 34/10, 57 R, 57 A, 57 D, 173, 34/174, 180, 186; 263/21 A

[56] References Cited

UNITED STATES PATENTS

| | | |
|---|---|---|
| 3,070,970 | 1/1963 | Zagar et al. .................... 34/10 |
| 3,391,913 | 7/1968 | Jones ........................ 34/57 A X |
| 2,336,017 | 12/1943 | Jewell et al. .................... 34/10 |
| 2,797,908 | 7/1957 | Zubrzycki ................. 34/57 A X |

Primary Examiner—Frederick L. Matteson
Assistant Examiner—W. C. Anderson
Attorney—Charles L. Board

[57] ABSTRACT

Apparatus for drying particulate solid materials employing a fluidized bed of the material to accomplish drying. Drying is carried out in a chamber having walls defining a confined mass of the particles which is of slab-like configuration to preclude channeling of the fluidizing gas and consequent poor efficiency. Heated agitator means are provided to assist in maintaining the fluidity of the bed notwithstanding the tendency thereof to pack in the presence of moisture.

7 Claims, 4 Drawing Figures

PATENTED OCT 3 1972  3,694,924

INVENTORS
Herbert Kenneth Staffin
Robert Staffin
by Leonard S. Knox
Atty

APPARATUS FOR DRYING PARTICULATE SOLIDS

BACKGROUND OF THE INVENTION

In U.S. Pat. No. 3,350,915, there is disclosed apparatus which employs a mass of small solid particles confined in a chamber. By flowing a gas, e.g., air, through the mass the gas-particle mixture, which is in a continuous state of agitation, behaves in the manner of a quasi-liquid. This condition is described as "fluidized" and the apparatus as "fluidized bed apparatus".

Apparatus so characterized is frequently used for drying solid products such as small granular particles and powders, hereinafter referred to generically as "particulate material". In a typical application, the fluidizing gas such as air or nitrogen is heated before admission to the fluid bed and serves as the drying medium. Heretofore the chamber has been circular or approximately square in horizontal cross section. In some applications supplementary heat is applied to the walls of the chamber.

There are a number of problems associated with fluid bed drying to the solution of which the present invention is directed:

1. The drying rate is limited by the rate at which heat can be brought into the bed. Since most materials have a maximum allowable exposure temperature, the rate of heat input is limited to the heat capacity of the fluidizing gas at maximum temperature plus the maximum rate of heat transfer through the walls of the chamber. This total heat-transfer rate may be too low to meet the requirements of the drying cycle.

2. Many particulate materials have high angles of repose in the wet state, particularly if the liquid phase contains a fraction of a component which is a solvent for the particles. Frequently this will cause little or no fluidization at the start of the drying operation, i.e., a fixed bed. In addition, such fixed bed will frequently exhibit a strong tendency toward gas channeling through the bed, thereby leaving a hole or holes which cause short circulating of the gas. The high angle of repose of the material encourages maintenance of channeling and results in low drying efficiency.

3. Most particulate materials employed in the fluidized bed technique are non-conducting. Accordingly static charge may build up during the later part of the drying cycle. In those cases where flammable solvents are being handled, the possibility of sparking represents a potential hazard.

SUMMARY OF THE INVENTION

The present invention relates to apparatus for drying particulate solids by the use of a fluidized bed of the particles being dried characterized in that the chamber containing the bed has a high ratio of lateral wall area to the distance between a pair of opposite walls. That is to say, the bed is made to assume a slab-like form with one of the two longer dimensions representing the depth of the bed. Since the lateral walls are heated there is thus provided a rapid rate of heat transfer from the walls through the bed which accelerates start-up, precludes channeling and increases the drying rate substantially. In another aspect the chamber is provided with an agitator of novel form which is also heated whereby the mass of material is conditioned to accept heat at a high rate and channeling avoided.

DESCRIPTION OF THE PREFERRED EMBODIMENTS

Figure 1:
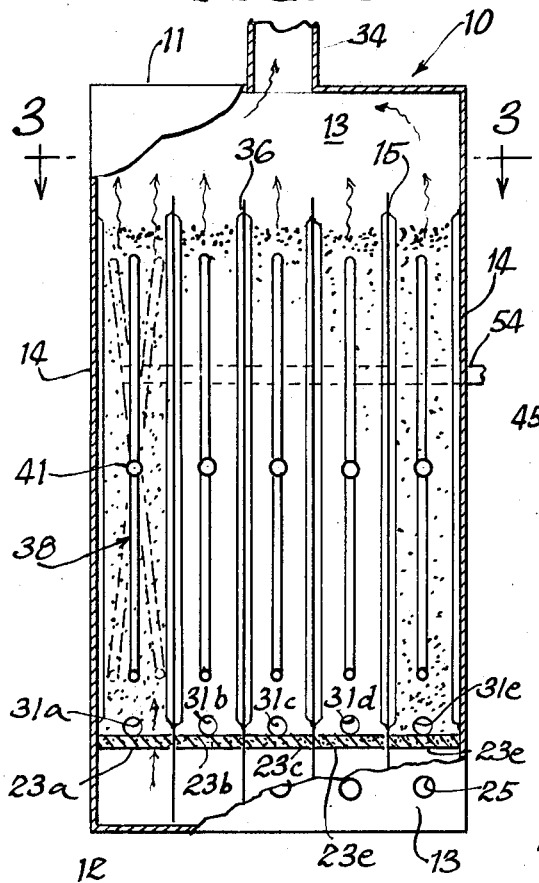
FIG. 1 is a combined end elevation and cross section through one exemplificative form of apparatus embodying the principles of the invention.

Adverting to the drawing there is shown (FIGS. 1, 2 and 3) apparatus in accordance with the invention comprising a cabinet 10 of sheet metal, having any suitable reinforcement, including a bottom wall 12, and walls 13—13, side walls 14—14 and a top wall 11. The cabinet 10 is divided by partitions 15 into a plurality of vertical compartments 18a, 18b, etc., which are substantially narrow in proportion to their length and height to define slab-like spaces within which the particulate material is received for processing. It will be understood from what follows that the proportion of width to the length and height of the compartments is a matter of design and that the width of each compartment will be so selected as to avoid the problems heretofore discussed, e.g., channeling. In turn, this width will be dependent on the tendency of the treated material to pack, which is a function of particle size and shape, coefficient of friction, alteration in behavior under heat, etc. Thus, it will be apparent that the optimum ratio is established somewhat empirically. In any case, tests have shown that a compartment shape aptly described as "slab-shaped" has been found best adapted to proper functioning of the apparatus. It has been found that ratio of length to height is on the order of 1:1 and that the ratio of height to width, i.e., thickness of the "slab", is greater than 3 to 1; typically 6:1.

The floor of each compartment comprises panels 23a, etc. which are of porous or open material, e.g., a ceramic or metal having porosities sufficiently small as to be proof against clogging but sufficiently permeable for passage of the gas. The gas, which may be heated, is desirably admitted through a manifold 24 and branches 25 therefrom. It will be seen that the panels 23a, etc. are spaced above the bottom 12 of the cabinet 10 to allow the entering gas to be distributed uniformly over the entire area of each of the panels 23a, etc.

The several charges of the particulate material may be loaded in any convenient manner. For example, the top 11 may be hinged and provided with a peripheral gasket or there may be individual access openings and covers, one individual to each compartment.

At this juncture it is to be noted that the several compartments are independent, so that less than the whole number, in the example, five, may be in use at a particular time. Obviously, any number of compartments, more or less than five, may be incorporated.

To discharge the material there are provided pipes 31a, etc. emptying into a common receptable via a header (not shown) or, if the drying time is different for some of the compartments, emptying may be into separate receptables. Gas leaving the several beds is discharged via a flue 34.

Heat is supplied to the several beds by means of cellular panel heaters, for example, those available from Dean Products, Inc., Brooklyn, New York. Essentially, these panels are shaped for circulation of steam, hot liquid or gas in a circuitous route, viz., by one continuous passage constituted in a zig-zag pattern, the steam entering the top and the condensate exiting at the bottom, or by a series of passages in parallel, there being a common header for entry of the steam and an opposite header for collecting condensate. In either case the construction is such as to result in inherent rigidity. For this reason the end walls 14—14 are panel heaters with the ducts disposed inwardly and the partitions 36 between beds have the ducts disposed on a medial plane. Thus, by distributing the source of heat on the extended side faces of virtually the entire bed, efficient heat transfer is assured. The heating panels may be connected to the steam supply in any preferred pattern, i.e., series, parallel or series-parallel. Since the mode of connection is conventional, elaboration will be dispensed with. Alternatively the walls of the compartments may be heated electrically, e.g., by Calrod heaters.

In order to avoid a relatively static condition of the particulate material, the apparatus includes an agitator 38 in each compartment. Preferably the agitator is sinuous and arranged to be heated, this latter supplementing the action of the outer walls and partitions.

The agitator 38 comprises U-shaped sections 40 of tubing carried on a manifold in the form of a hollow shaft 41, the sections 40 receiving steam or other heating medium from a suitable feed 45 and the condensate being discharged through a pipe 46 and trap 47. Stuffing boxes 51 and 52 allow the shaft 41 to be oscillated without interfering with circulation. Alternatively, the sections 40 may be constituted as one continuous length of tubing.

The means for oscillating the shaft 41 may take any well-known form. For example, there is shown a link 54 adapted for reciprocating movement by any suitable driving source. Each shaft 41 has a crank arm 55 at one end and these several cranks are pivotally connected to the link 54.

Figure 2:
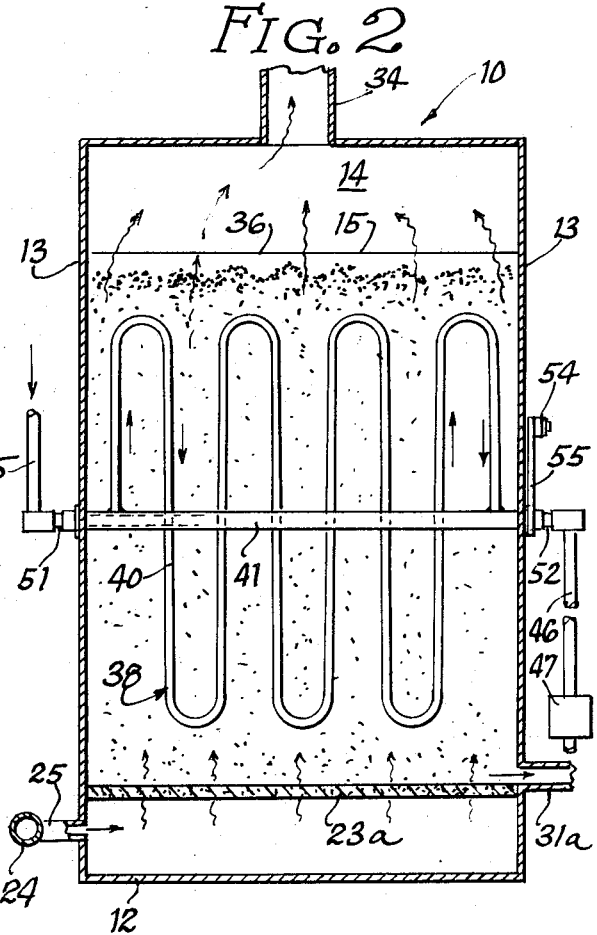
FIG. 2 is a combined side elevation and cross section through the apparatus of FIG. 1.
Figure 3:
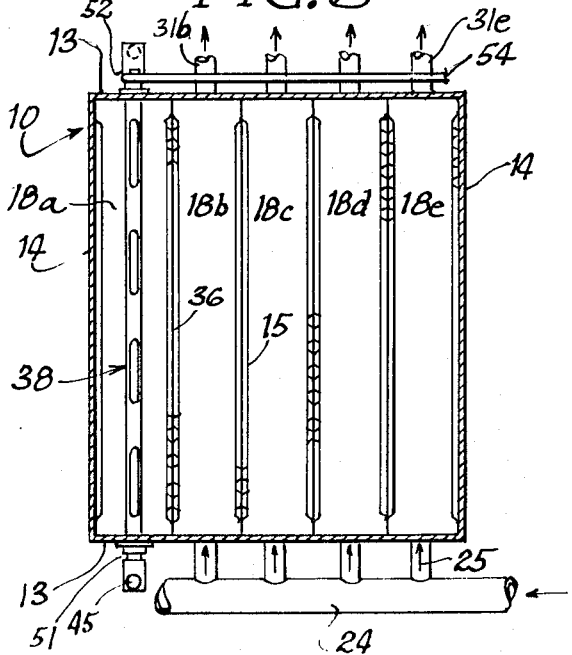
FIG. 3 is a cross section taken on the line 3—3 of FIG. 1.

FIG. 1 shows, in broken lines, one of the agitators (the one at the left) in its two extreme positions. For clarity only one of the agitators is shown in FIG. 3. In a pilot operation the agitator operated very slowly, about one oscillation in 5 minutes.

Figure 4:
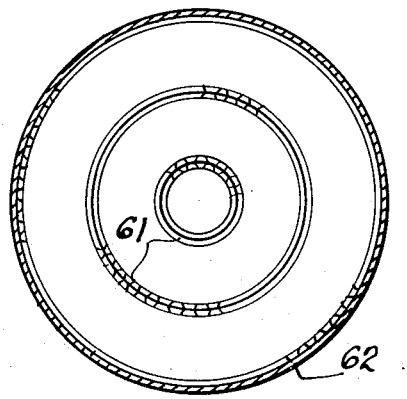
FIG. 4 is a horizontal cross section of an alternative form in which the configuration is cylindrical instead of parallelepipedic.

FIG. 4 illustrates a horizontal cross section of a modified chamber comprising a plurality of heated concentric cylindrical partitions 61 and a heated cylindrical outer wall forming, in this example, two annular spaces. It is believed that the operation of this embodiment will be apparent in view of the description above. The slab-like parallelepipedic spaces receiving the particulate material are now in the form of annuli of small thickness compared to the substantially larger wall area. Agitation may be effected by means similar to that described in connection with FIGS. 1 to 3.

The several advantages of the invention apparatus may be recapitulated as follows:

1. The high height to bed-thickness ratio reduces the tendency of the wet material to channel during the early part of the drying cycle. This is explained by the fact that the material has difficulty in assuming that angle of repose which will support a channel. Additionally, the coefficient of friction between the bed and the wall assists in maintaining stability and thereby precludes channeling. The foregoing is especially important in the case of a charge with a high volatile content and/or high particle-to-particle affinity.

2. In the geometry of the chamber there is a high ratio of heat transfer surface per pound of material being dried. This results in high drying rates at fixed maximum operating temperatures. By adjusting the distance between the heated partitions, the required rate of heat transfer through these heated surfaces into the bed may be established.

3. The relative proximity of the heating surfaces assist in dissipating static charge within the unit.

We claim:

1. The method of drying particulate solid material which comprises:
   a. providing a chamber defining a space of generally parallelepipedic configuration to receive the material as a mass which is thin relative to the length and height of the space,
   b. charging a batch of material into the space,
   c. mechanically agitating the batch of material with a heated agitating means and flowing a heated, gaseous medium upwardly through the batch at a rate of flow inducing fluidization of the batch, and for a time sufficient to dry the batch, and
   d. discharging the dried batch from the chamber.

2. Apparatus for drying particulate solid material comprising a pair of mutually-confronting vertical side walls having means adapted to heat the same, a pair of opposite end walls and a bottom wall, the width and height of the side walls having a ratio of about 1:1, each of said width and height being a substantial multiple of the distance between the side walls to define with the end walls and bottom wall a slab-like space to receive material for drying said multiple being greater than 3:1, the bottom wall being gas-pervious, a closed chamber beneath said bottom wall and in communication therewith, means to admit gas to the chamber, means to heat said gas to a temperature sufficient to dry the material, means to agitate the material during drying, said agitating means comprising a plurality of paddle-like members having a hollow interior, means to deliver a heated medium to said interior and power driven means to oscillate said members.

3. Apparatus in accordance with claim 2 in which said multiple is about 6:1.

4. Apparatus in accordance with claim 2 wherein the means adapted to heat the vertical side walls is comprised of a plurality of passages over substantially the entire extent of the walls and means to circulate a heating medium through said passages.

5. Apparatus for drying particulate solid material comprising a pair of mutually-confronting vertical side walls having means adapted to heat the same, a pair of opposite end walls and a bottom wall, the width and height of the side walls having a ratio of about 1:1, each of said width and height being a substantial multiple of the distance between the side walls to define with the end walls and bottom wall a slab-like space to receive material for drying said multiple being greater than 3:1, the bottom wall being gas-pervious, a closed chamber beneath said bottom wall and in communication therewith, means to admit gas to the chamber, means to heat said gas to a temperature sufficient to dry the material, means to agitate the material during drying, said agitating means comprising a tubular member arranged in a serpentine configuration, a shaft to support said member for oscillation, power means to drive said shaft and means to circulate a heating medium through said member.

6. Apparatus in accordance with claim 5 in which said multiple is about 6:1.

7. Apparatus in accordance with claim 5 wherein the means adapted to heat the vertical side walls is comprised of a plurality of passages over substantially the entire extent of the walls and means to circulate a heating medium through said passages.

* * * * *